UNITED STATES PATENT OFFICE 2,500,349

PROCESS FOR BREAKING PETROLEUM EMULSIONS

Melvin De Groote, University City, and Bernhard Keiser, Webster Groves, Mo., assignors to Petrolite Corporation, Ltd., Wilmington, Del., a corporation of Delaware No Drawing. Application April 17, 1948, Serial No. 21,754

5 Claims. (Cl. 252—340)

The present application is a continuation-in-part of our co-pending application Serial No. 734,205, filed March 12, 1947 (now abandoned).

This invention relates to petroleum emulsions of the water-in-oil type that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion.

One object of our invention is to provide a novel process for breaking or resolving emulsions of the kind referred to.

Another object of our invention is to provide an economical and rapid process for separating emulsions which have been prepared under controlled conditions from mineral oil, such as crude oil and relatively soft waters or weak brines. Controlled emulsification and subsequent demulsification under the conditions just mentioned, are of significant value in removing impurities particularly inorganic salts from pipeline oil.

Demulsification, as contemplated in the present application, includes the preventive step of commingling the demulsifier with the aqueous component which would or might subsequently become either phase of the emulsion, in absence of such precautionary measure. Similarly, such demulsifier may be mixed with the hydrocarbon component.

The demulsifying agent employed in the present process is the hydrophile oxyalkylated derivative of a partial ester of a polyhydric alcohol selected from a group consisting of pentaerythritol, polypentaerythritol, and mixtures thereof. The particular ester is that derived from stearic acid.

The chemical compound or compounds herein contemplated as demulsifying agents, can be obtained or produced by any suitable process. Our preference is to prepare a fractional or partial ester of stearic acid and pentaerythritol or dipentaerythritol or tripentaerythritol, or a similar polyhydric reactant. After such partial ester is obtained, it may be subjected to oxyalkylation, particularly oxyethylation, in the manner employed for oxyalkylating alcohols or partial esters. The procedure just described is old and simply involves treatment of the reactant with a suitable alkylene oxide, preferably in presence of an alkaline catalyst, for approximately 2 to 10 hours, the temperatures varying up to 175° C., and the pressure varying from 25 to 300 pounds per square inch.

The alkylene oxide which we use is preferably one having not over 4 carbon atoms, and particularly ethylene oxide, propylene oxide, butylene oxide, glycide, methylglycide, or the chloro derivatives which are the equivalent of the oxides.

The partial esters obtained from stearic acid and pentaerythritol or its equivalent, are apt to be hard and wax-like in appearance. After oxyalkylation, the appearance varies from that of a solid to a liquid, and the products may have wax- to resin- or fat-like character. In any event, we use sufficient oxyalkylating agent to produce distinct hydrophile properties, as indicated by self-emulsifiability, and preferably distinct hydrophile properties, as shown by giving a perfectly clear and transparent appearance in water in dilute solution, for instance 1 to 3.

As to the pentaerythritol compounds employed, reference is made to U. S. Patent No. 2,356,745, dated August 29, 1944, to Barth et al. The following is a verbatim excerpt as it appears in said patent.

In the manufacture of pentaerythritol by the condensation of acetaldehyde and formaldehyde, in addition to the pentaerythritol itself, smaller amounts of related hydroxylated substances are also obtained. One of these obtained in a considerable amount is dipentaerythritol, which is an ether of the following structure:

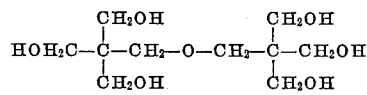

(See Brun, "Uber den Dipentaerythritol," Wilhelm Greven, Krefeld, 1930.) Another related hydroxylated substance, obtained in somewhat smaller amounts, is white and crystalline, melts at 230–240° C. and has a hydroxyl content of 33%. It is related to dipentaerythritol in that it contains pentaerythritol residues bound by ether linkages. Regardless of chemical structure, for purposes of definition in this specification and in the claims, this substance will be termed pleopentaerythritol.

According to the best evidence available, pleopentaerythritol is probably a mixture of dipentaerythritol, tripentaerythritol, and possibly additional related alcohols.

Dipentaerythritol, tripentaerythritol, and pleopentaerythritol may be grouped together under the generic term "polypentaerythritols," by which term is meant those compounds of higher molecular weight than pentaerythritol which are formed either actually or theoretically by etherifying one or more of the hydroxyl groups of pentaerythritol with other pentaerythritol residues.

The normal esters of pentaerythritol and the polypentaerythritols may be formed by using methods long known in the art, such as heating them with acids or anhydrides, with or without a catalyst, under conditions favorable to the removal of water.

Having obtained a suitable pentaerythritol reactant, it is combined with stearic acid in any suitable manner, that is, by combination with stearic acid or stearyl chloride or a low molal ester of stearic acid, such as methyl, ethyl, propyl, or butyl ester.

Partial esters of stearic acid which are particularly suitable include the following: Pentaerythritol monostearate, pentaerythritol distearate, pentaerythritol, tristearate, dipentaerythritol stearate, dipentaerythritol distearate, dipentaerythritol tristearate, and dipentaerythritol tetrastearate. Similarly, one may employ the stearic acid esters of tripentaerythritol or the other products grouped together under the generic polypentaerythritols and previously referred to in the aforementioned U. S. Patent No. 2,356,745. As to other patents relating to the esterification of pentaerythritol and similar products, reference is made to U. S. Patent No. 2,360,393, dated October 17, 1944, to Burrell; U. S. Patent No. 2,360,394, dated October 17, 1944 to Burrell; U. S. Patent No. 2,340,043, dated January 25, 1944, to Clare; and British Patent No. 405,826, dated February 15, 1934, to E. I. du Pont de Nemours & Company.

ESTER

Example 1

| | Grams |
|---|---|
| Stearic acid (0.7 mole) | 200 |
| Pentaerythritol (0.7 mole) | 95 |

Commercial pentaerythritol monostearate is available in the open market, and presumably such commercial product is obtained by the use of apparatus involving an inert gas, such as carbon dioxide or oxygen, to prevent slight or modest oxidation by air during processing. In our experiment no effort was made to prevent the possible introduction of a small amount of air, during stirring in the conventional flask. The reaction was conducted in the usual stirring device at 220 to 250° C. until the acid value dropped to almost zero. If a mixture of the kind above described was prepared, it will be noted that the acid value at the start of the reaction is approximately 153. After heating for three hours at the indicated temperature, the acid value has dropped to a mere fraction of this amount, somewhat near 6. During this period of the reaction 9 c. c. of water was evolved. There was some "bumping" during the evolution of water but the bumping stopped when all the water had been eliminated. The product was hard and had the typical appearance of commercial pentaerythritol monostearate, except that it was somewhat darker in color.

ESTER

Example 2

| | Grams |
|---|---|
| Stearic acid (0.7 mole) | 200 |
| Pentaerythritol (0.35 mole) | 47.5 |

The same procedure was followed as in Example 1, preceding, except that the temperature employed for esterification was 240° to 280° C, the reaction mass was held at this temperature for 3 hours. The amount of water evolved was the same as before, to wit, 9 c. c. The acid value of the final product when finished was less than 6. What has been said in the previous examples in regard to bumping applies in the instant experiment also. The material was a hard, greyish-black, wax-like product.

ESTER

Example 3

| | Grams |
|---|---|
| Stearic acid (0.7 mole) | 200 |
| Pentaerythritol (0.233 mole) | 31.7 |

The same procedure was followed as in the two preceding examples. The temperature employed for reaction was 220° to 250° C. The reaction mass was held at the first temperature for 3 hours with an additional final 10-minute period of 270° C. The amount of water evolved was slightly over 8 c. c. The acid number of the final product dropped to less than 3. The appearance of the final product was a hard, wax-like material, similar in appearance to the preceding example.

ESTER

Example 4

| | Grams |
|---|---|
| Stearic acid (0.35 mole) | 100 |
| Dipentaerythritol (0.35 mole) | 89 |

The same procedure was followed as in the preceding examples. The reaction was completed by use of a temperature range of 220° to 250° C. for 2½ hours. The amount of water evolved was 4½ cc. The acid value at the end of the reaction was approximately 4. The appearance of the product was the same as in the preceding example.

ESTER

Example 5

| | Grams |
|---|---|
| Stearic acid (0.7 mole) | 200 |
| Dipentaerythritol (0.35 mole) | 89 |

The same procedure was followed as in preceding Examples 1 to 4. The temperature employed to complete the reaction was 220° to 250° C. for approximately 2½ hours. The amount of water evolved was somewhat in excess of 6 c. c. The acid value of the final product was 6.5. The appearance of the product was the same as in previous example, that is, waxy and greyish-white in color.

ESTER

Example 6

| | Grams |
|---|---|
| Stearic acid (0.7 mole) | 200 |
| Dipentaerythritol (0.233 mole) | 59.3 |

The same procedure was followed as in the preceding examples. The reaction period was 2½ hours at 220° to 262° C. The amount of water evolved was in excess of 7 c. c. The acid number of the final product was 6.3. The appearance of the final product was the same as in the preceding examples, to wit, hard, waxy and greyish in color.

OXYALKYLATED ESTER

Example 1

One-half gram mole of pentaerythritol monostearate (201.3 grams) was dissolved in 200 grams of xylene, and 4 grams of sodium methylate in powdered form were added. The mixture was placed in an autoclave equipped with a stirrer. A portion of ethylene oxide, 50 to 100 grams, was now added, the autoclave was closed, the stirring device started and the contents heated until the developed pressure dropped to zero. Upon cooling, another portion of the oxide was added and the heating procedure repeated until the total amount of ethylene oxide added in all step-wise additions was 415 grams in five or six batches. The maximum pressure developed during each addition of ethylene oxide was approximately 125 to 145 pounds per square inch, gauge pressure. The time of reaction of the ethylene oxide in each instance requires approximately 3 to 5 hours. When addition was complete, the pressure drops to practically zero or not more than the pressure due to the xylene alone. At the completion of the reaction approximately twice the weight or slightly more of ethylene oxide has been added per unit weight of pentaerythritol monostearate. The material obtained is a clear, amber-colored liquid which dissolves readily in water. It will be noted that in the above procedure approximately 9 moles of ethylene oxide are added per mole of pentaerythritol monostearate or 4½ gram moles of ethylene oxide per each one-half gram mole of the stearate.

Entirely aside from the above procedure, it is desirable to emphasize at this point that the exact ratios above indicated do not have to be followed, but may be varied so as to give a series of oxyethylated products, if desired. Furthermore, the solvent employed, for instance, xylene, may be eliminated by evaporation or distillation, including vacuum distillation, so as to yield the solvent-free product.

The final product, on a solvent-free basis has characteristic oil- to fat-like character and shows distinct hydrophile effect when as little as 3 moles of ethylene oxide have been added to one mole of pentaerythritol monostearate and is readily water-miscible or soluble, as above indicated, when as much as 9 moles of ethylene oxide have been added per mole of pentaerythritol monostearate, and is very clearly water-soluble when 12 moles or more of the ethylene oxide have been added.

The time of addition is immaterial, provided the reaction is completed. We have found that the time noted for addition of ethylene oxide can be varied by speeding up the stirring device or ethylene oxide may be added continuously. In varying the above experiment, where approximately 200 grams of pentaerythritol monostearate are employed, we have been able to add approximately one-third the total amount of ethylene oxide employed, for instance, 135 to 140 grams, in as little as 3 hours, and also have been able to add as much as 550 grams in 8 to 16 hours. The addition of ethylene oxide can also be speeded up by adding a bit more catalyst, for instance, twice as much as employed in the above experiment, or perhaps using somewhat higher temperatures, for instance, temperatures of 175° C. or thereabouts, and gauge pressures up to 200 pounds. These are simply obvious variations and it is immaterial in regard to the nature of the final product, provided one ultimately causes the predetermined amount of ethylene oxide to combine per mole unit or weight unit of the pentaerythritol monostearate, or for that matter, any of the other esters mentioned elsewhere.

Incidentally, as far as a solvent goes, we have found that any other comparable aromatic solvent is just as satisfactory, for instance, toluene or cymene, or any other solvents mentioned elsewhere. Here again, the solvent is absolutely immaterial, provided it is a solvent for the reaction mass.

Subsequent reference to the same procedure as is employed in Example 1, refers specifically to described operation in the first complete paragraph under the heading "Oxyalkylated ester, Example 1".

OXYALKYLATED ESTER

*Example 2*

The same procedure is employed, except that one pound mole of pentaerythritol distearate is employed and the amount of ethylene oxide added varies from 12 to 48 moles.

OXYALKYLATED ESTER

*Example 3*

The same procedure is followed as in Example 1, except that one pound mole of pentaerythritol tristearate is substituted for pentaerythritol monostearate. The amount of ethylene oxide added varies from 10 to 60 moles.

OXYALKYLATED ESTER

*Example 4*

Dipentaerythritol monostearate is substituted for pentaerythritol monostearate in Example 1, preceding.

OXYALKYLATED ESTER

*Example 5*

Dipentaerythritol distearate is substituted for pentaerythritol distearate in Example 2, preceding.

OXYALKYLATED ESTER

*Example 6*

Dipentaerythritol tristearate is substituted for pentaerythritol tristearate in Example 3, preceding.

In order to illustrate the increased hydrophile effect as ethylene oxide is added, the following examples are presented with step-wise information so as to illustrate this particular point. The esters referred to by number are the preceding esters identified by example numbers indicated. The six (Ester, Example 1 through and including Ester, Example 6) give a gel or a paste in xylene. A gel or paste was perfectly satisfactory for the subsequent oxyalkylation procedure. These materials were oxyalkylated in the usual manner, as previously indicated. The amount of sodium methylate added as a catalyst is indicated in each instance.

It is to be noted that glycide should be employed with extreme care, due to the danger of a spontaneous explosion or detonation. Methylglycide requires equally careful handling. Reactions of a similar nature can often be conducted with less hazard by using epichlorohydrin. See German Patent No. 670,419, dated January 18, 1939. However, we have found that for the present purpose the derivatives obtained from ethylene oxide appear to be particularly satisfactory and there is no obvious advantage in employing a reactant involving enhanced hazard. As to the preparation of glycide (glycidol) see J. Am. Chem. Soc. 52, 1521 (1940).

Conventional demulsifying agents employed in the treatment of oil field emulsions, are used as such or after dilution with any suitable solvent, such as water and petroleum hydrocarbons, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents such as pine oil, carbon tetrachloride, sulfur dioxide extract obtained in the refining of petroleum, etc., may be employed as diluents. Similarly, the material or materials employed as the demulsifying agent of our process, may be admixed with one or more of the solvents customarily used in connection with conventional demulsifying agents. Moreover, said material or materials may be used alone or in admixture with other suitable well-known classes of demulsifying agents.

It is well known that conventional demulsifying agents may be used in a water-soluble form, or in an oil-soluble form, or in a form exhibiting both oil and water-solubility. Sometimes they may be used in a form which exhibits relatively limited oil solubility. However, since such reagents are sometimes used in a ratio of 1 to 10,000, or 1 to 20,000, or even 1 to 30,000, or even 1 to 40,000, or 1 to 50,000, in desalting practice, such an apparent insolubility in oil and water is not significant, because said reagents undoubtedly have solubility within the concentration employed. This same fact is true in regard to the material or materials employed as the demulsifying agent of our process.

We desire to point out that the superiority of the reagent or demulsifying agent contemplated in our process is based upon its ability to treat certain emulsions more advantageously, and at somewhat lower cost than is possible with other available demulsifiers, or conventional mixtures thereof. It is believed that the particular demulsifying agent or treating agent herein described will find comparatively limited application, so far as the majority of oil field emulsions are concerned, but we have found that such a demulsifying agent has commercial value, as it will economically break or resolve oil field emulsions in a number of cases which cannot be treated as easily or at so low a cost with the demulsifying agents heretofore available.

In practicing our process for resolving petroleum emulsions of the water-in-oil type, a treating agent or demulsifying agent of the kind above described, is brought into contact with or caused to act upon the emulsion to be treated, in any of the various apparatus now generally used to resolve or break petroleum emulsions with a chemical reagent, the above procedure being used either alone or in combination with other demulsifying procedure, such as the electrical dehydration process.

The demulsifier herein contemplated may be employed in connection with what is commonly known as down-the-hole procedure, i. e., bringing the demulsifier in contact with the fluids of the well at the bottom of the well, or at some point prior to the emergence of said fluids. This particular type of application is decidedly feasible when the demulsifier is used in connection with acidification of calcareous oil-bearing strata, especially if suspended in or dissolved in the acid employed for acidification.

A somewhat analogous use of our demulsifying agent is in the removal of a residual mud sheath which remains after drilling a well by the rotary method. See U. S. Patent No. 2,135,589, dated November 8, 1938, to Monson. Sometimes the drilling mud contains added calcium carbonate or the like to render the mud susceptible to reaction with hydrochloric acid or the like, and thus expedite its removal. Our compound is particularly adapted for use in connection with such treatment involving the use of strong mineral acid.

One preferred and more narrow aspect of our invention, insofar as it is concerned with demulsification of petroleum emulsions of the water-in-oil type, is concerned with the admixture of the hydrophile hydroxypolyalkoxy compound herein described, with a viscosity-reducing solvent such as the various solvents enumerated, particularly aromatic solvents, alcohols, ether alcohols, etc., as previously specified. The word "solvent" is used in this sense to refer to the mixture, if more than one solvent is employed, and generally speaking, it is our preference to employ the desmulsifier in a form representing 25% to 85% demulsifier and 15% to 75% solvent, largely, if not entirely, non-aqueous and so selected as to give a solution or mixture particularly adaptable for proportional pumps or other measuring devices. The following examples will illustrate this aspect of our invention:

DEMULSIFIER

Example 1

| | Per cent |
|---|---|
| Oxyethylated pentaerythritol monostearate (10 moles ethylene oxide per mole of stearate) | 60 |
| Xylene | 20 |
| Isopropyl alcohol | 20 |

DEMULSIFIER

Example 2

| | Per cent |
|---|---|
| Oxyethylated pentaerythritol monostearate (15 moles ethylene oxide per mole of stearate) | 70 |
| Denatured alcohol | 20 |
| Cresylic acid | 10 |

DEMULSIFIER

Example 3

| | Per cent |
|---|---|
| Oxyethylated pentaerythritol monostearate (20 moles ethylene oxide per mole of stearate) | 70 |
| Aromatic petroleum solvent | 10 |
| Isobutyl alcohol | 10 |
| Acetone | 10 |

DEMULSIFIER

Example 4

| | Per cent |
|---|---|
| Oxyethylated dipentaerythritol distearate (30 moles of ethylene oxide per mole of distearate) | 65 |
| Denatured alcohol | 15 |
| Dichloroethyl ether | 20 |

(The above proportions represent percentage by weight.)

It is to be noted that the oxyalkylated products herein contemplated may be employed as intermediates for the manufacture of more complicated derivatives which may serve for the same uses as the products herein described. Such derivatives are particularly valuable in the treatment of petroleum emulsions, as herein contemplated. Since the final product represents hydroxylated products, usually polyhydroxylated products, obviously the action is possible with a variety of acidic reactants, such as the following:

Low molal monocarboxy acids, as exemplified by acetic acid, butyric acid, etc.; low molal hydroxycarboxy acids, as exemplified by hydroxyacetic acid, lactic acid, etc.; low molal alpha-carboxy acids, such as chloroacetic acid, etc.; polycarboxy acids of varying molecular weight, such as maleic acid, phthalic acid, citraconic acid, adipic acid, and particularly the anhydrides thereof, such as phthalic anhydride, maleic anhydride, etc.; higher molal monocarboxy acids, such as higher fatty acids, resin acids, acids obtained by the oxidation of petroleum, etc., and particularly oleic acid, stearic acid, ricinoleic acid, hydroxystearic acid, etc.

Furthermore, what is said in regard to the derivatives immediately preceding, applies with equal force and effect to derivatives obtained by further reaction from such previously described compounds. For instance, products derived from chloroacetic acid or other alpha-chloromonocarboxy acids, can be reacted with tertiary amines, such as pyridine dimethyldecylamine, hydroxylated tertiary amines, or esterified hydroxylated tertiary amines, so as to give quaternary ammonium compounds. Maleic acid derivatives can be reacted with sodium bisulfite to give the corresponding sulfosuccinates. Such maleic compounds can also be reacted so as to give addition products with various unsaturated compounds, particularly olefines and conjugated diolefines.

It is to be emphasized that the amount of oxyalkylating agent added per mole of stearate may vary within a considerable range. Generally speaking, the range would vary from approximately 12 moles of ethylene oxide or glycide (glycidol) to as many as 36 moles of ethylene oxide, whereas, a polypentaerythritol tetrastearate might be treated with as many as 100 to 120 moles of ethylene oxide.

Having thus described our invention, what we claim as new and desire to secure by Letters Patent is:

1. A process for breaking petroleum emulsions of the water-in-oil type, characterized by subjecting the emulsion to the action of a demulsifier including a hydrophile hydroxy-polyalkoxy compound obtained by the action of an alkylene oxide containing a reactive ethylene oxide ring and having not over 4 carbon atoms, on a stearic acid partial ester of a polyhydric alcohol, selected from the group consisting of pentaerythritol, polypentaerythritols, and mixtures thereof, the molar proportions of the partial ester and alkylene oxide being in the range of from about 1:3 to about 1:60.

2. The process of claim 1, wherein the alkylene oxide is ethylene oxide.

3. A process for breaking petroleum emulsions of the water-in-oil type, characterized by subjecting the emulsion to the action of a demulsifier including a hydrophile, hydroxypolyalkoxy compound obtained by the action of ethylene oxide on pentaerythritol monostearate, the molar proportions of the partial ester and alkylene oxide being in the range of from about 1:3 to about 1:12.

4. A process for breaking petroleum emulsions of the water-in-oil type, characterized by subjecting the emulsion to the action of a demulsifier including a hydrophile, hydroxypolyalkoxy compound obtained by the action of ethylene oxide on pentaerythritol distearate, the molar proportions of the partial ester and alkylene oxide being in the range of from about 1:12 to about 1:48.

5. A process for breaking petroleum emulsions of the water-in-oil type, characterized by subjecting the emulsion to the action of a demulsifier including a hydrophile, hydroxypolyalkoxy compound obtained by the action of ethylene oxide on pentaerythritol tristearate, the molar proportions of the partial ester and alkylene oxide being in the range of from about 1:10 to about 1:60.

MELVIN DE GROOTE.
BERNHARD KEISER.

REFERENCES CITED

The following references are of record in the file of this patent:

UNITED STATES PATENTS

| Number | Name | Date |
|---|---|---|
| 1,970,578 | Schoeller et al. | Aug. 21, 1934 |
| 2,052,284 | De Groote | Aug. 25, 1936 |
| 2,104,795 | De Groote | Jan. 11, 1938 |
| 2,307,058 | Moeller | Jan. 5, 1943 |
| 2,340,043 | Clare | Jan. 25, 1944 |
| 2,356,745 | Barth et al. | Aug. 29, 1944 |
| 2,360,393 | Burrell | Oct. 17, 1944 |
| 2,360,394 | Burrell | Oct. 17, 1944 |
| 2,427,255 | Burrell et al. | Sept. 9, 1947 |

FOREIGN PATENTS

| Number | Country | Date |
|---|---|---|
| 405,826 | Great Britain | Feb. 15, 1934 |